United States Patent

[11] 3,610,816

[72] Inventors Fritz Jaeschke
Darmstadt;
Hartmut Wendt, Weiterstadt, both of
Germany

[21] Appl. No. 846,305
[22] Filed July 28, 1969
[45] Patented Oct. 5, 1971
[73] Assignee Fernseh GmbH
Darmstadt, Germany
[32] Priority Aug. 1, 1968, Jan. 30, 1969
[33] Germany
[31] P 17 62 671.0 and P 19 04 393.7

[54] METHODS FOR CONVERTING COLOR TELEVISION STANDARDS
18 Claims, 12 Drawing Figs.

[52] U.S. Cl. .......... 178/5.4 C, 178/DIG. 24
[51] Int. Cl. .......... H04n 5/02
[50] Field of Search .......... 178/5.4 C, 5.2 R, DIG. 24

[56] References Cited

UNITED STATES PATENTS 3,475,548 10/1969 McMann, Jr. .......... 178/5.4
3,475,549 10/1969 Goldmark et al. .......... 178/5.2

*Primary Examiner*—Robert L. Griffin
*Assistant Examiner*—George G. Stellar
*Attorney*—Michael S. Striker

ABSTRACT: A method for color standard conversion for color television, in which the color television signal to be converted is separated into luminance and chrominance components. The chrominance component from the separating step is converted in an auxiliary chrominance signal of lower carrier frequency. The lower carrier frequency signal is an integral multiple of the line frequency of the color television signal to be converted. The auxiliary chrominance signal is reproduced on the screen of a black-white picture tube which is then scanned corresponding to the synchronizing standard to which the television signal is to be converted. The signal resulting from this scanning step is then converted to a chrominance signal having the color carrier frequency of the new standard, and this converted chrominance signal is then combined with the luminance signal which has been converted to conform to the new standard.

Inventors:
Hartmut Wendt
Fritz Jaeschke
by
Attorney

PATENTED OCT 5 1971 3,610,816

SHEET 02 OF 11

Inventors:
Hartmut Wendt
Fritz Jaeschke
by Attorney

Inventors:
Hartmut Wendt
Fritz Jaeschke
by
Attorney

Inventors:
Hartmut Wendt
Fritz Jaeschke
by
Attorney

Inventors:
Hartmut Wendt
Fritz Jaeschke
by
Attorney

Inventors:
Hartmut Wendt
Fritz Jaeschke
by Attorney

Inventors:
Harmut Wendt
Fritz Jaeschke
by
Attorney

Inventors:
Hartmut Wendt
Fritz Jaeschke
by
Attorney

Inventors:
Harmut Wendt
Fritz Jaeschke
by
Attorney

Inventors:
Hartmut Wendt
Fritz Jaeschke
by
Attorney

Inventors:
Hartmut Wendl
Fritz Jaeschke

METHODS FOR CONVERTING COLOR TELEVISION STANDARDS

BACKGROUND OF THE INVENTION

The present invention relates to a method for converting color television signals between standards of different vertical frequency and/or horizontal frequency, and color coding.

Methods of the preceding species serve to convert color television signals of a predetermined standard, so that the signal-transmissions may also be received in countries which have other color television standards than those of the transmitting countries. For example, it is necessary to convert the U.S.A. transmissions with the NTSC method of 525 lines and a field frequency of 60 Hz., for the purpose of distributing the transmitted signals also throughout Europe. For this purpose, the number of lines of 525 must be converted to 625, and the field frequency of 60 Hz. must be converted to 50 Hz.

Electronic standard converters are known in the art, for converting between signals of different number of lines. These standard converters are, however, not usable for conversion of standards with different field frequency.

Another electronic standard converter has been made to convert signals of one standard into another standard having a field frequency different from the first standard. A prerequisite for such conversion is, however, that the two field frequencies are related by a whole number.

The preceding electronic standards converter is, for this reason, not applicable for converting the American standard to the European standard. This results from the condition that the field frequency of the American standard is not precisely 60 Hz., but is instead approximately 1 percent below the black-white field frequency for purposes of attaining good compatibility of the reproduced signal. Thus, the American field frequency is 59.94 Hz. With a 6:5 standards converter, too low a field frequency would be attained as a result of the 1 percent factor. Accordingly, instead of 50 Hz., a field frequency of 49.95 Hz. would be made available. As a result of this condition, deviations from the desired value are also incurred in the coupled horizontal and color carrier frequencies. For proper operation and function of the color carrier regeneration in the receiver, it is required to maintain the frequency tolerance for the color carrier to $\pm 10^{16}$. By using a 6:5standard converter, it is necessary to refrain from coupling of the color carrier with the horizontal frequency, when no additional or auxiliary magnetic tape recording is provided in between. A further disadvantage of the conventional 6:5 standards converter resides in the condition that the converted picture can be reproduced only in a other aspect ratio. This implies that the picture tube of the receiver does not have its available surface fully utilized when displaying the reproduced signals. Thus, for a given sized screen of a picture tube, the visible picture will be substantially smaller than the area of the available screen.

In one apparent method which may be carried out, the signal to be converted as, for example, an NTSC color composite signal is demodulated in the conventional manner and transmitted in the primary signals RGB. Each of these three signals is then converted in a conventional black-white standards converter, to the second standard as, for example, 625 lines/50 Hz. standard. The resulting primary signals are then newly coded through, for example, a PAL encoder. Such a method, however, doe not only require a large amount of equipment in the form of three standard converters, but also leads to deterioration in the picture quality. Thus, color borders and hue variations in the converted picture result from the unavoidable registration error and brightness fluctuations in the use of standard conversion for black-white signals through vidicon standard converters.

Accordingly, it is an object of the present invention to reduce the required amount of equipment for the color standards conversion, and to improve the quality of the reproduced picture, when compared to the conventional or known methods.

The object of the present invention is achieved by splitting or separating the color television signal which is to be converted, into its luminance and chrominance components, through preferably a comb filter. A new auxiliary signal is produced from the chrominance signal through mixing with a predetermined frequency. The auxiliary signal is of essentially lower frequency which is an integral multiple of the line frequency. The auxiliary signal is reproduced upon the screen of a black-white picture tube, and the picture corresponding to the synchronization standard is scanned. This synchronizing standard corresponds to that in which the applied signal is to be converted. The signal derived from the scanning is converted to a chrominance signal according to the new standard, and becomes added in the convention manner to the luminance signal converted to the new standard.

In view of the conversion of the frequency of the color carrier into a frequency which is a multiple of the line frequency, this signal, when reproduced on the screen of a picture tube, exhibits a pattern of equally spaced stripes.

The appearance of such stripes has been avoided in the reproduction of color television signals through choice of a color carrier frequency which is an uneven multiple of the half horizontal frequency. This resides on the basis that in this case a dot pattern results in which the bright and dark picture dots are spaced linewise.

The simultaneous conversion of the chrominance signal into a auxiliary signal on a carrier of lower frequency results in a coarse stripe pattern. In rescanning such a striped pattern adequate results are achieved even with reduced resolution of the picture displayed and scanned.

The hue in a picture appears thereby in shifted position of the stripes, in contrast to the position of the stripes from the unmodulated carrier.

The process of carrying out the conversion of the color carrier into one which is converted to another standard may be realized through an electro-optical standards converter. Such an optical standards converter, however, incurs numerous dividers and multiplying stages, so that a relatively large and complex equipment is necessary. It is furthermore possible that the desired effect may not be realized when the color carrier is incorrectly coupled to the line frequency, or errors prevail in this coupling.

In a further development of the present invention, this disadvantage is avoided by providing that the auxiliary color carrier is produced from a start-stop oscillator controlled by the horizontal frequency.

This oscillator starts at the beginning of each line with the same phase, and thereby gives rise to a pattern of vertical stripes upon the screen of the picture tube of the optical standards converter.

The start-stop oscillator produces interruptions in rhythm to the horizontal frequency and commences always with the same phase in every line. Through this action of the oscillator, it provides an oscillatory signal which is independent of the frequency to which it is tuned and which has a frequency that is a multiple of the horizontal frequency. The latter has no disturbing phase modulation.

Following the standard conversion, the frequency of the auxiliary carrier in the converted chrominance signal is $f'$ instead of $f$. In an electro-optical standards converter, the scanning results with other speed than the tracing of the vertical striped pattern written with the auxiliary chrominance signal. The difference between $f$ and $f'$ is not large in the case of standard conversion between a color television signal of the American standard with 525 lines and 60 fields, and a color television signal of the European standard with 625 lines and 50 fields. This is due to the condition that the line frequencies of both standards only slightly (0.87 percent) differ. The auxiliary carrier of the standard converted new chrominance signal $f'$ is, thereby, also in this case substantially 1 MHz.

Since errors may appear in the optical standards converter due to nonlinearity and inaccuracies of adjustment, a reference carrier is to be transmitted besides to the chrominance signal. This can be accomplished through the combination of at least two pilot frequencies which are integral multiples of the auxiliary color carrier. Preferably, these two pilot frequencies are uneven integral multiples of the auxiliary color carrier frequency. The multiplying of the frequencies is selected so that the pilot frequencies as well as their combination frequencies of the first order fall within the usable band or are of the pilot frequencies themselves.

When the frequency of the auxiliary carrier is approximately 0.8 MHz., the frequencies multiplied by a factor of 3 and a factor of 5 are, advantageously, pilot frequencies. By doubling the first pilot frequency with the frequency 3 f' associated with a factor of 3 applied to the converted color carrier frequency f', the frequency 6 f' is realized and is mixed with the second converted pilot frequency 5 f'. The resulting frequency f', thereby, produces the reference carrier for the converted chrominance signal. The two color difference signals can, thereby, be derived in the conventional manner, through synchronized demodulators.

SUMMARY OF THE INVENTION

A method for converting color television signals from one standard to another standard. The color television signal to be converted is separated into luminance and chrominance components by means of a filter arrangement. The chrominance component resulting from the separating step is mixed with a predetermined frequency for generating an auxiliary chrominance signal on a carrier of lower frequency. The frequency of this carrier is an integral multiple of the line frequency of the color television signal to be converted. The auxiliary chrominance signal is reproduced on the screen of a black-white picture tube. The picture reproduced on the screen is then scanned corresponding to the synchronizing standard to which the color television signal is to be converted. The signal realized from the scanning step is then converted in a chrominance signal having the color carrier frequency of the new standard, and the thus resulting converted signal is combined with the luminance signal which has been converted to conform to the new standard to which the television signal is to be converted.

The auxiliary chrominance signal is combined with pilot frequencies which are multiples of the horizontal frequency. The pilot frequencies lie outside of the frequency band used for the auxiliary chrominance signal and is an integral multiple of the horizontal frequency. The combined pilot frequency and the auxiliary chrominance signal are converted in a first black-white standard converter. The frequencies of the converted pilot frequencies are modified then to the frequency of the color carrier, and the modified pilot frequencies are applied to a first synchronized demodulator. The modified pilot frequency is also shifted in phase by 90°, and this phase-shifted modified pilot signal is applied to a second synchronized demodulator. The modified pilot frequency signals serve as reference frequencies in these two demodulators. The luminance signal is delayed so as to apply a time compensating feature to this signal. This time compensated luminance signal is then processed together with the color difference signals available from the outputs of the demodulators, so as to realize the television signal with the desired new standard.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
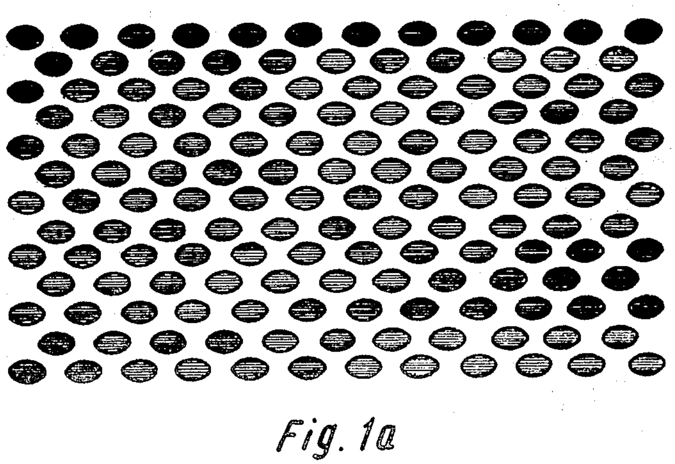
FIG. 1*a* is the picture pattern of the color carrier of a color television signal corresponding to a predetermined standard.
Figure 1B:
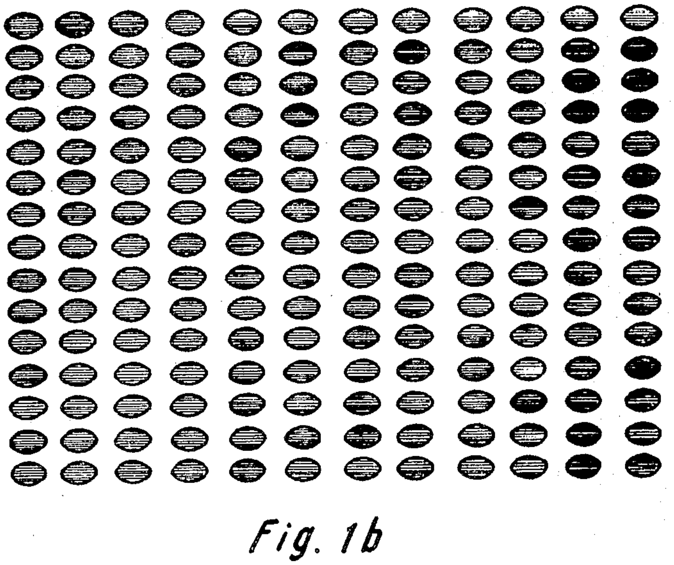
FIG. 1*b* is the picture pattern of a new color carrier realized in accordance with the present invention.

FIG. 1*a* shows the pattern of a picture which produces a color carrier with an uneven number of half-line frequencies (half-line offset), upon the picture screen of a television picture tube. Such a color carrier corresponds, for example, to an NTSC color carrier. When the signal frequency varies in multiplicity of the line frequency, the dot pattern changes to a strip pattern, as shown in FIG. 1*b*.

Figure 2:
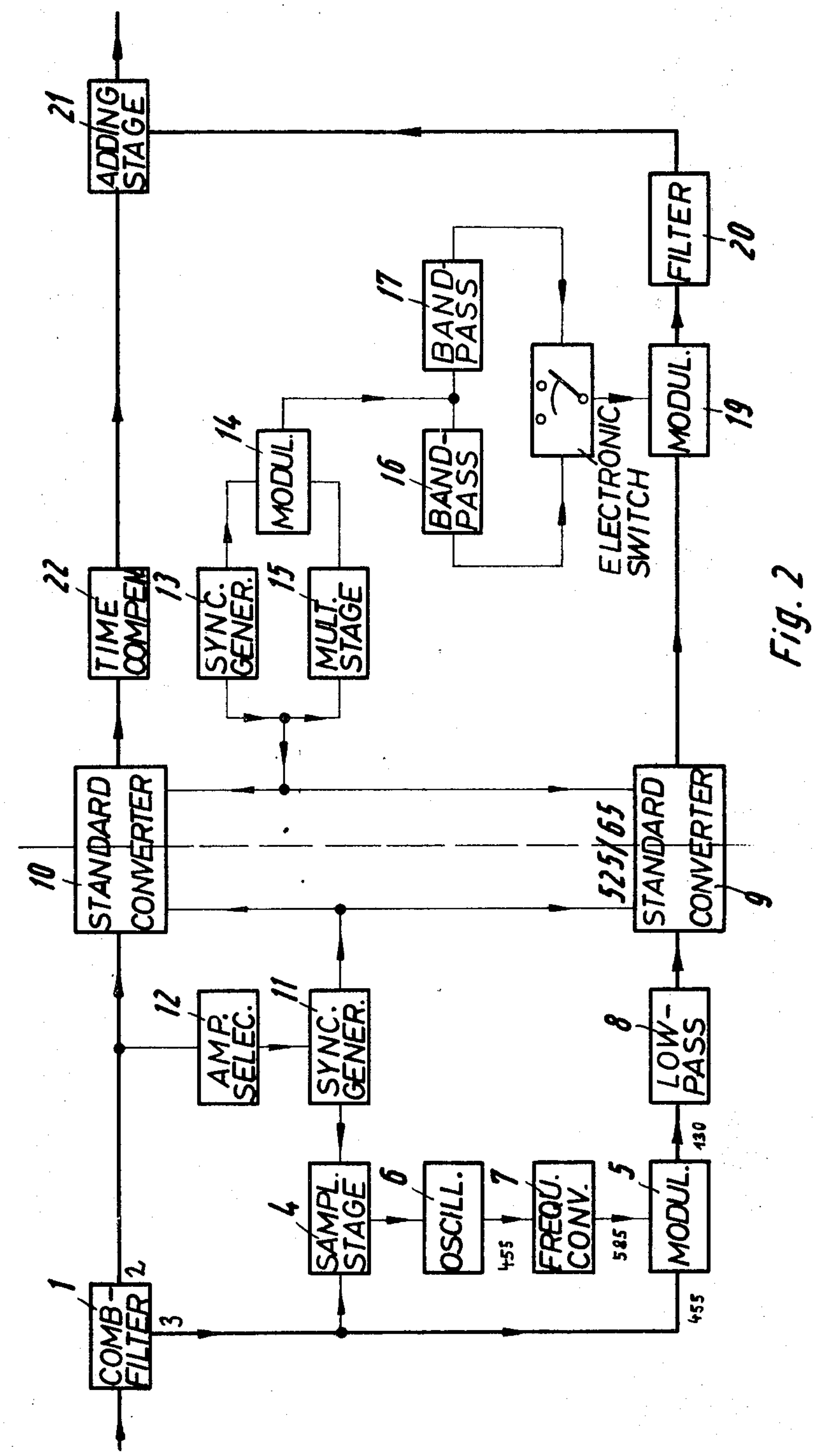
FIG. 2 is a block diagram of a first embodiment through which one method of the present invention may be carried out.
Figure 3:
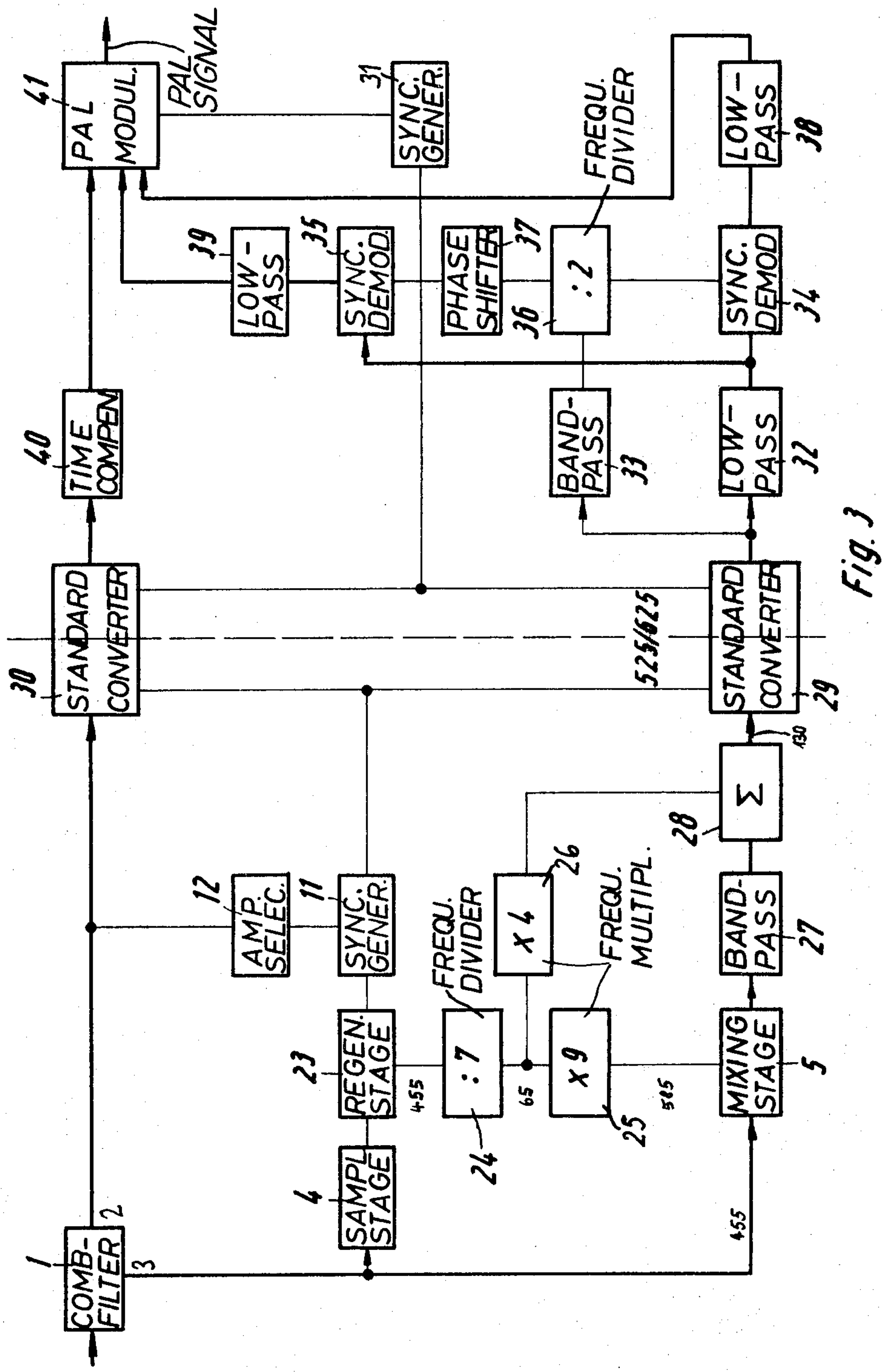
FIG. 3 is a block diagram of a second embodiment for carrying out the method of the present invention.
Figure 4A:
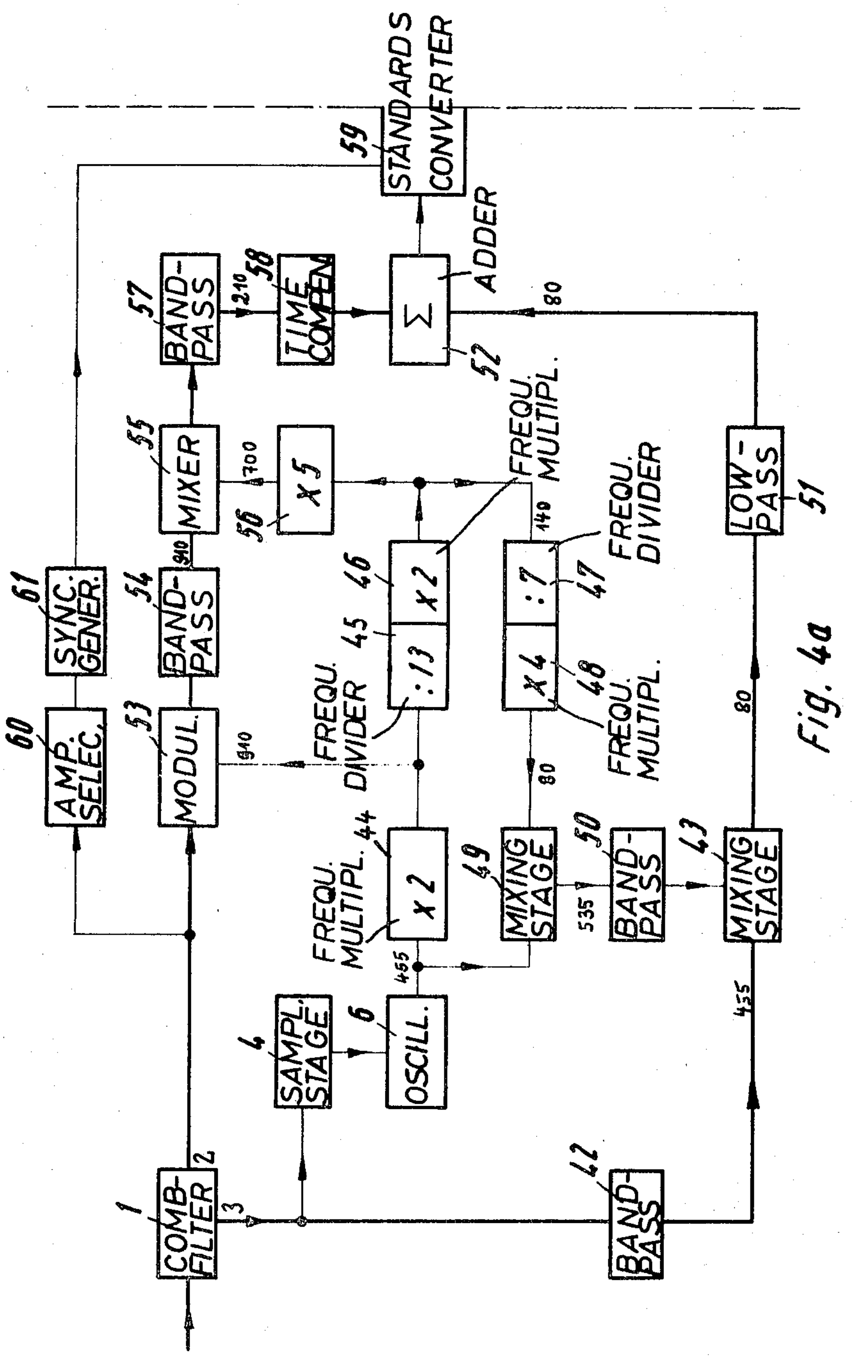
FIGS. 4*a* and 4*b* are block diagrams of a third embodiment for carrying out the method of the present invention.
Figure 4B:
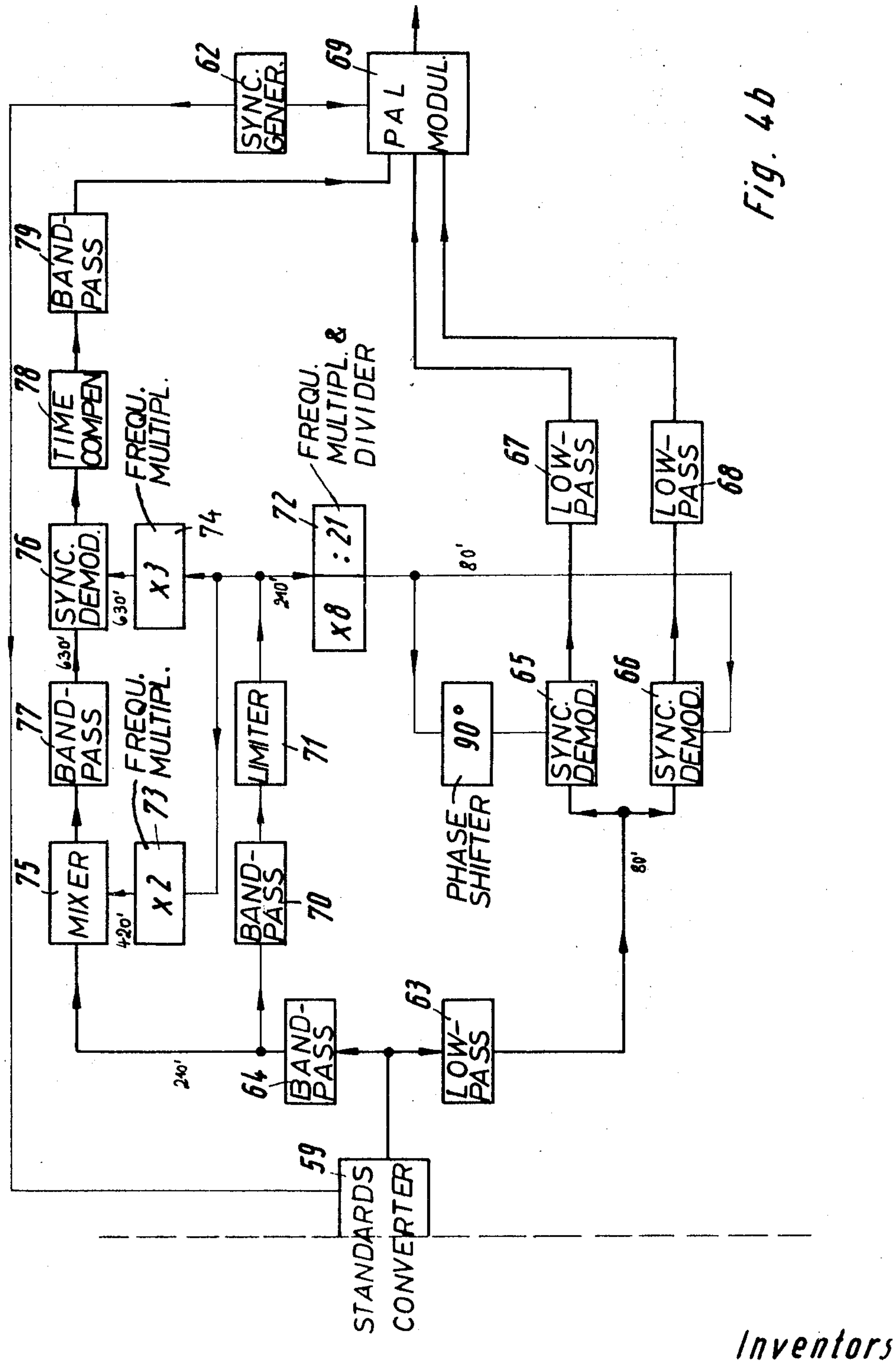

FIG. 2 shows a block diagram for carrying out the method, in accordance with the present invention. FIGS. 3, 4*a* and 4*b* show additional embodiments for carrying out that method. In accordance with the embodiment of FIG. 2, a 525-line NTSC signal is to be converted to a 625-line PAL signal. The signal which is to be converted, is applied to a filter 1 which separates the signal into its luminance and chrominance components. The light intensity signal or brightness signal corresponding to the luminance component, has a frequency range of 0 to 4.2 MHz., and appears at the terminal 2 of the filter 1. The chrominance signal at the terminal 3 of the filter 1, has a frequency of 3.6 ±0.6 MHz. This signal is applied to a sampling stage 4 and a modulator 5. The carrier frequency of 3.6 MHz. represents the 455th half-line frequency $f_H$. In these and subsequent FIGURES, the multiples of the half-line frequencies $f_H$ or $f'_H$ are designated with lower case characters corresponding to the position numerals.

The color synchronizing signal is isolated within the sampling stage 4. The sampling stage 4 becomes actuated or controlled through a pulse generator 11 which, in turn, is controlled through applied pulses. These pulses applied to the pulse generator 11 are derived from the luminance signal at the terminal 2, through the amplitude filter 12. The color carrier of frequency 3.6 MHz ($455f_H$) is realized from the sampling stage 4, through the oscillator 6. Through the frequency converting stage 7, the color carrier is converted, through frequency division and multiplying, into a new frequency of 9/7 of the original NTSC color carrier frequency corresponding to 4.62 MHz. ($585f_H$). This color carrier and the chrominance signal are applied to the modulator 5. The latter provides, at its output , the sum and difference frequency of 16/7 and 2/7 of the output frequency of 3.6 MHz.

The signal with the frequency difference ($136f_H$) becomes filtered out through the low-pass filter 8, and becomes converted into the 625-line standard, through a black-white standard converter 9. This black-white standard converter 9 provides a carrier frequency signal which must be shifted or transferred, through further conversion, into the standard frequency of the PAL color carrier. One output of the pulse emitter 13 is applied to a multiplying stage 15 which raises the line frequency of the pulse signals from the emitter 13, by a factor of 6/5. After passing through the multiplying stage 15, these pulse signals originating from the pulse emitter 13 are applied to a modulation stage 14. The output pulse signal from the pulse emitter 13 has a PAL carrier frequency of 4.43 MHz., and is also applied to the modulation stage 14. These pulse signals from the emitter 13 become, thereby modulated through the signal output of the multiplying stage 15. The resulting modulated product is applied to the inputs of two band filters 16 and 17, each of which serves to filter out one of the two sidebands. The two sidebands with frequencies of 3.4 and 5.4 MHz. become alternatingly modulated onto the chrominance signal derived from the standard converter 9, through the application of an electronic switch 18, as well as the modulator 19. The output of the modulator 19 is applied to a filter 20 which filters out one of the two sidebands from the modulation product obtained from the unit 19. The filtered output of the unit 20 is, in turn, applied to an adding stage 21. The standard converter 10 converts the luminance signal from a 525-line standard to a 625-line standard, and applies the resulting signal to a time compensator 22. In the adding stage 21 the output of the unit 22 is added to the new PAL signal with the 625-line standard.

The advantage of the color standard conversion produced through the preceding embodiment, resides in the condition that brightness and color information become converted from the standard point of view, independent of each other. In the conventional conversion process, it is possible for color borders to appear in the planes of the color signals RGB through three standard converters, and result from the covering error which is substantially unavoidable. In the method of the present invention, this situation does not prevail.

FIG. 3 shows another embodiment of the present invention. This embodiment solves the identical task assigned to FIG. 2, which is the conversion of an NTSC/525-line signal into a PAL/625-line signal. The essential difference between the two embodiments resides in the introduction of an auxiliary pilot frequency. With the aid of this pilot frequency, it is possible to eliminate the effect of nonlinearity in the horizontal deflection in optical electrical converters. As a result, it is also possible to realize error-free color standard conversion when using vidicon standard converters.

In the embodiment of FIG. 3, the NTSC/525-line signal to be converted, is again applied to a filter 1 which separates the luminance signal from the chrominance signal. The luminance signal taken from the terminal 2 of the filter 1, is applied to the amplitude filter 12, from which the synchronizing pulses are realized for the purpose of synchronizing the pulse generator 11.

For purposes of regenerating the color carrier, the color synchronizing signal derived from the chrominance signal is applied, through the pulse generator 11, to a regenerating stage 23. The output of the sampling stage 4 is also applied to this regenerating stage 23. The output signal of the regenerating stage 23 has a frequency equal to 455 times the half-line frequency $f_H$, and becomes divided down to 1/7, through the frequency-dividing stage 24. The new frequency is therefore, $65f_H$. Through the two frequency-multiplying stages 25 and 26, this new frequency becomes multiplied by factors of 9 and 4, respectively. The frequency obtained from the multiplying stage 25, therefore, is $585f_H$. This resulting frequency is mixed, in the mixing stage 5, with the chrominance signal which has a carrier frequency of $455f_H$. The frequency difference of $130f_H$ becomes filtered out of the mixed product, through means of a band-pass filter 27. The output signal from the band-pass filter 27 is applied to an adding stage 28, which also receives the output from the frequency multiplier 26. This signal output from the frequency-multiplying stage 26 has a frequency of $260f_H$, and the result of adding the two input signals to the unit 28, is applied to the black-white standard converter 29 which may be in the form of a vidicon standard converter. The luminance signal derived from the filter 1 is applied to the standard converter 30. Both of the standard converters are connected to the input of the pulse generator 11 which provides the signal to be converted from line count into corresponding synchronizing pulses. The output terminals of both standard converters 29 and 30 become controlled by the pulse emitter 31 for the second standard. The signal derived from the standard converter 29 is applied to a low-pass filter 32 and the band-pass filter 33. Through these two filters 32 and 33, the output of the standard converter 29 becomes separated into a new pilot frequency and a new chrominance signal. The chrominance signal becomes demodulated through two synch demodulators 34 and 35. The output of the band-pass filter 33 is applied to the frequency divider 36 which halves the new pilot frequency and is thereby made equal to the carrier frequency of the chrominance signal. The output of the frequency divider 36 is applied directly to the synch demodulator 34, whereas the synch demodulator 35 receives the output of the frequency divider 36 by way of a phase shift 37. The phase-shifting unit 37 serves to phase shift the signal by 90°. At the outputs of the two synch demodulators 34 and 35, the two color difference signals U and V appear in conjunction with the carrier frequency. The carrier frequencies become suppressed by the two low-pass filters 38 and 39.

The signal from the standard converter is compensated in time through the compensator 40, and the delayed luminance signal is applied to the PAL modulator, together with the color difference signals U and V. The PAL modulator 41 is controlled by the pulse emitter 31, and provides the PAL signal at its output.

In the embodiment of FIG. 4, a carrier serves simultaneously as the pilot frequency as well as the carrier for the luminance information. In this arrangement, only a single black-white standard converter for converting color television signals into color standards, is necessary between standards with different vertical frequency and/or horizontal frequency, and color coding.

Similar to the embodiments already described, the color television signal to be converted is also split or separated, in this embodiment, into a luminance signal and the chrominance signal, through means of a filter 1.

The chrominance signal from the filter 1, is applied, on the one hand, to the sampling stage 4 and, on the other hand, to the band-pass filter 42 which leads to the mixing stage 43. In this mixer, the color carrier becomes mixed with a frequency which is 535 times the horizontal frequency. The preceding color carrier has a frequency equal to 455 times the half horizontal frequency. The frequency with a factor of 535 is derived from the signal frequency which is 455 times the horizontal frequency. This is accomplished through doubling in the frequency-multiplying stage 44, dividing down by 13 in the frequency-dividing stage 45, then doubling in the frequency-multiplying stage 46, dividing down to 1/7 in the frequency-dividing stage 47, multiplying by a factor of 4 in the frequency-multiplying stage 48, and mixing the result which is 80 times the horizontal frequency with the frequency derived from the oscillator stage 6. The mixing is performed in the mixing stage 49 and the output of this mixing stage is a frequency which is 455 times the half horizontal frequency. The output of the mixer 49 is applied to the mixing stage 43, by way of a band filter 50. The mixed product from the mixing stage 43 is applied to a low-pass filter 51 which transmits only the difference frequency which produces the new color carrier which is modulated with the color information. This difference frequency from the unit 51 is equal to 80 times the half-horizontal frequency. The new color carrier obtained from the output of the low-pass filter 51, is added, in the adding stage 52, to the pilot frequency which is modulated with the luminance signal.

The luminance signal derived from the filter 1 is applied to the modulator stage 53. The output of the multiplier 44 which is 910 times the half horizontal frequency, is also applied to the modulator 53. The output of this modulator 53 is applied to a band filter 54 which, in turn, feeds a mixing stage 55. The modulated pilot frequency from this mixer 55 is applied to a further band filter 57 which has its output connected to a time compensator 58. This pilot frequency signal in modulated form, is then united with the new color carrier of lower frequency within the adding stage 52. Both carriers are applied to he input of a standard converter 59. The standard converter 59 is controlled from the output of a pulse generator 61 which is, in turn, controlled from the synchronizing pulses separated from the luminance signal through an amplitude filter 60 connected in series with the pulse generator 61.

At the output side of the standard converter 59, the latter is controlled from the clock 62 corresponding to the 625-line standard. This standard corresponding to the signal derived from the standard converter 59, is applied to a low-pass filer 63 and the band-pass filter 64 for the purpose of splitting this signal into two separate signals. The lower frequency band signal obtained from the output of the low-pass filter 63, is applied, in turn, to two synch demodulators 65 and 66. The lower frequency output signal from the filter 63 has a modulated carrier of 80 times the half new line frequency $f'_H$. The two color difference signals U and V result from the synchronizing demodulators 65 and 66, and each of these color difference signals are applied to he PAL modulator 69, by way of low-pass filters 67 and 68.

The carrier of the luminance signal with frequency equal to 210 times the half-line frequency $f'_H$ becomes filtered out of the upper frequency band signal obtained from the band-pass filter 64, through means of the band-pass filter 70. The resulting filtered signal is then limited in amplitude through the limiter 71. The resulting carrier serves primarily for producing the reference carrier required for the demodulation in the synchronizing demodulators. In the multiplier and frequency divider 72, the carrier is converted in frequency by a factor of 8/21, and this converted frequency signal is applied directly to the synchronizing demodulator 66. At the same time, the output of the frequency-multiplying and dividing stage 72 is also applied to the synchronizing demodulator 65, through a phaseshift circuit which shifts the phase of the signal by 90°. The limited carrier is applied to the doubling stage 73 where it is brought to the value of $420f'_H$, and at the same time, to the multiplying stage 74 where it is brought to the value of $630f'_H$. After passing through the stages 73 and 74, the signal serves as a reference frequency within the mixing stage 75 or the synchronizing demodulator 76. In the mixing stage 75, the luminance signal of carrier frequency becomes mixed with the doubled frequency signal resulting from the stage 73. The resulting mixing frequency reaches a synchronizing demodulator 76, by way of the band-pass filter 77. The new video frequency luminance signal is realized through the synchronizing demodulator 76. The output of the synchronizing demodulator 76 is applied to a further band-pass filter 79 by way of the time compensator 78 and is then transmitted to the PAL modulator 69 from the output of the band-pass filter 79. The PAL modulator 69 is controlled from the clock 62.

In the PAL modulator 69, the PAL signal with 625 lines/50 Hz. standard is produced, in the conventional manner, from the converted luminance and color difference signals.

Figure 5:
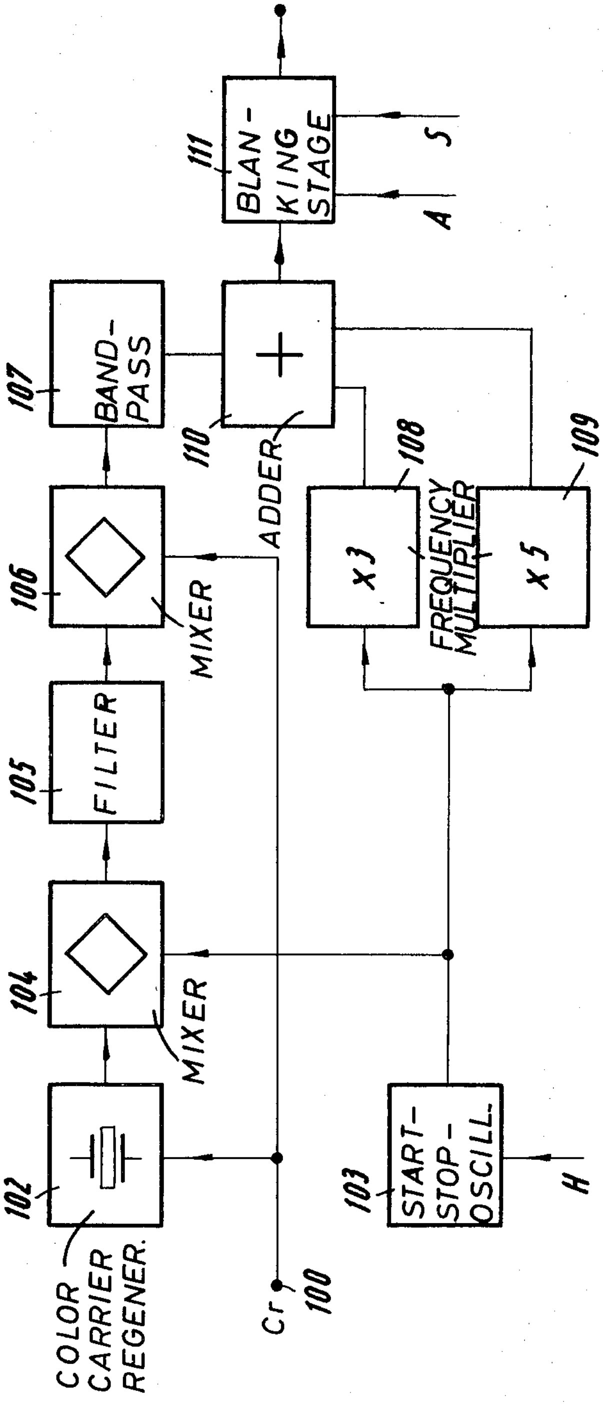
FIG. 5 is a block diagram of an embodiment for preparing the chrominance signal to be converted prior to application to an optical standard converter.

In the block diagram of FIG. 5, the terminal 100 is the junction or connection and which is realized through the splitting or separating of, for example, an NTSC signal into luminance and chrominance signals. The chrominance signal is applied to the color carrier regenerator 102 in which the color carrier of, for example 3.6 MHz. is regenerated. The oscillator 103 is of the start-stop oscillator type and provides the new color carrier selected in frequency at approximately 0.8 MHz. The oscillator 103 is controlled through the horizontal frequency H. The two outputs from the oscillator 103 and the regenerator 102 are applied to a mixer 104 for the purpose of realizing a resulting frequency of, for example, 4.4 MHz., after suppressing the remaining components of the mixed products in the filter 105 which applies its output to a further mixer 106. In this mixer 106 the filtered output is mixed with the chrominance signal. The modulated new color carrier ($f+\Delta f$) derived from the band-pass filter 107 and the mixer 106, is applied to an adding stage 110. The modulated new chrominance signal is then combined within this adding stage 110 with the pilot frequencies of $3f$ and $5f$ realized from the multiplying stages 108 and 109, respectively. These two multiplying stages multiply the frequency by a factor of 3 and 5, respectively. Before this mixed signal is applied to the optical standard converter, it becomes sampled through the sampling stage 111 to which sampling signals A and synchronizing pulses S are applied.

Figure 6:
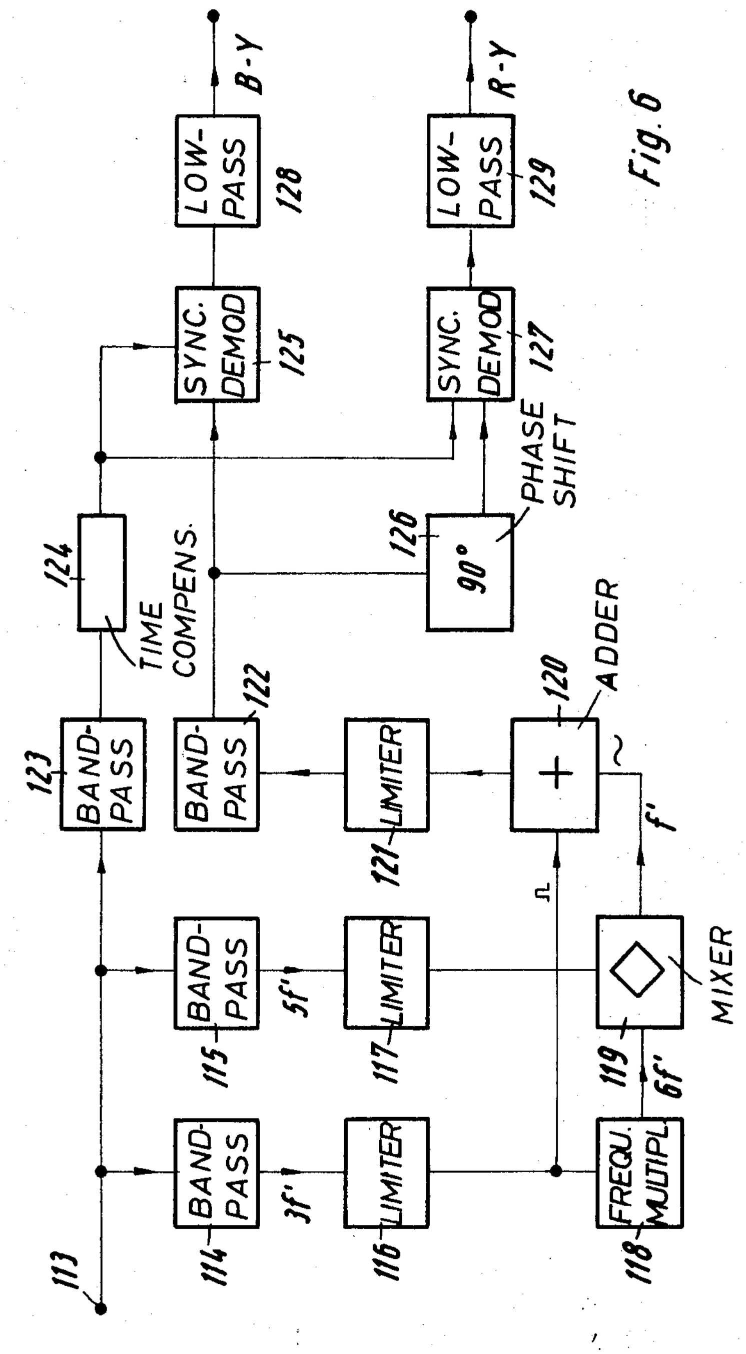
FIG. 6 is a block diagram for further processing of signals derived from an optical standard converter.

The block diagram of FIG. 6 illustrates further processing of the signals provided by the optical standards converter, for the purpose of realizing the converted color difference signals B–Y and R–Y. The signal mixture realized from the optical standard converter is applied to the two band-pass filters 114 and 115, as well as the band-pass filter 123.

In the band-pass filters 114 and 115, the converted pilot frequencies $3f'$ and $5f'$, respectively, become extracted from the signal mixture. The resulting signals are then limited, respectively, by limiting circuits 116 and 117 which are connected to these band-pass filters 114 and 115. The pilot frequency $3f'$ from the limiter 116 is converted to the frequency $6f'$ through the multiplying stage 118 which multiplies the frequency by a factor of 2. The output of the multiplier 118 is applied to a mixer 119 where the signal frequency $6f'$ is mixed with the frequency $5f'$ realized from the limiter 117. The resulting frequency difference $f'$ and the limited pilot frequency $3f'$ become added through the adding stage 120, and the output sum from the adder 120 is limited through the limiter 121.

Through the addition of the limited first pilot frequency $3f'$ and the reference frequency $f'$ realized from the mixer 119, a considerable reduction in the phase error is obtained. FIGS. 7a–7d illustrate the conditions of reduced disturbances.

Figure 7:
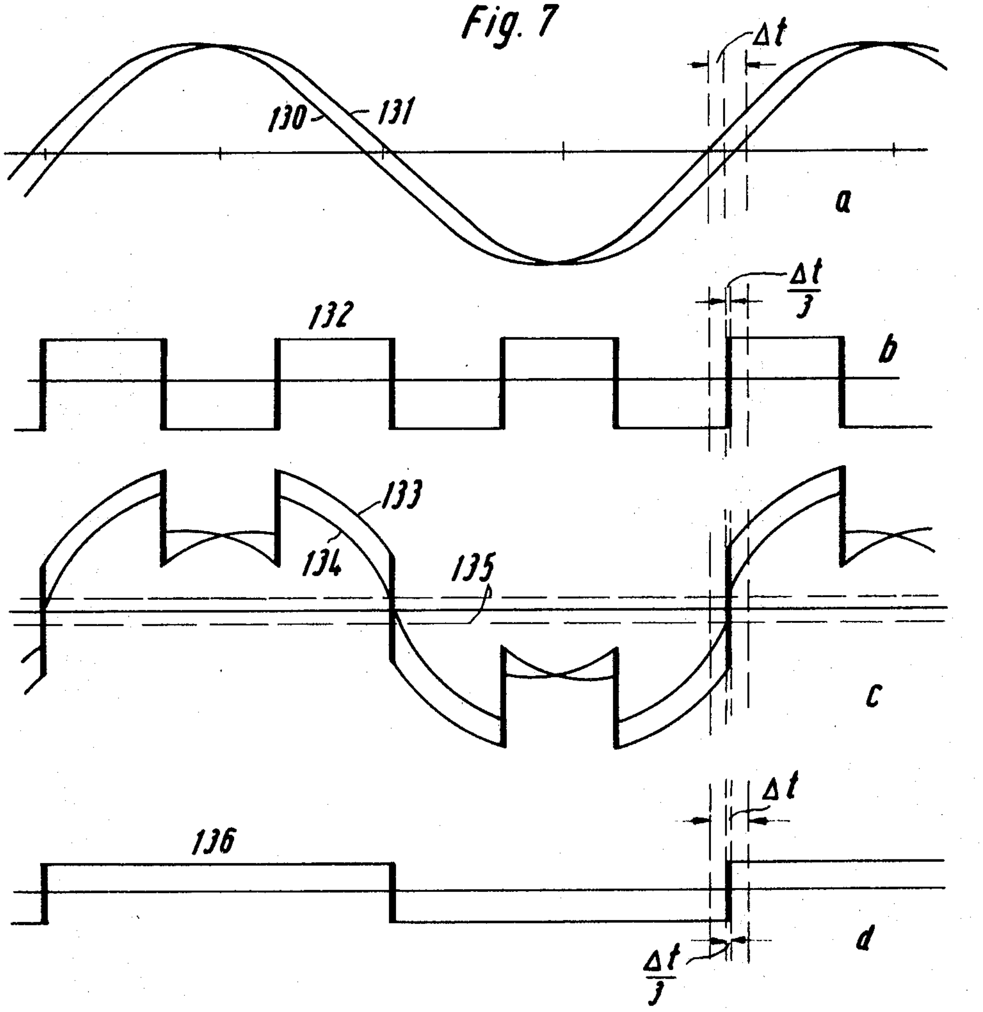
FIG. 7 is a graphical representation of curves describing the operation of the method of the present invention for reducing phase errors.

FIG. 7 shows the variation of the signals from the mixer 19, as a function of time, through the curves 130 and 131 for the reference carrier. These curves are designed to illustrate the limits of the possible phase error represented by ($\Delta t$) along the null axis. The curve 132 in FIG. 7b shows, as a function of the same time base, the signal 132 emitted by the emitter 116. Since the frequency of this signal is $3f'$, and the phase error is somewhat the same, the time interval between two intersections of the null axis by the curve 132 is only substantially $\Delta t/3$. The curves 133 and 134 in FIG. 7c represent the sums or summations of the curves 130, 131 and 132. It is possible to see from these summation curves that the displacement caused by the phase error at the null axis, is equal to that of the curve 132. If, now, the summation signal is limited to the magnitude 135, for example, then the reference carrier acquires the form illustrated in FIG. 7d. In this form the prevailing phase error is reduced to one third of its original value.

A still further considerable reduction in the phase error can be achieved by adding the signal of frequency $5f'$ obtained from the limiter 117, to the reference carrier $f'$. This addition of the output signal from the limiter 117 is, auxiliary to the processing of the signal, delivered by the limiter 116. After having been subjected to limiting, the rectangular-shaped reference carrier serves for obtaining the color difference signals B–Y and R–Y in the synch demodulators 125 and 127. One input to these synchronizing demodulators 125 and 127, is derived from the band-pass filter 123, by way of the timing compensator 124,. The reference carrier is applied to these synchronizing demodulators 125 and 127 as a second input. Whereas this reference carrier is applied directly to the synchronizing demodulator 125 from the band-pass filter 122, this reference carrier is phase-shifted by 90° through the unit 126, before applying to the synchronizing demodulator 127. The outputs of the synchronizing demodulators 125 and 127 are applied, respectively, to low-pass filters 128 and 129 which provide, in turn, the color difference signals B–Y and R–Y, for further processing.

Figure 8:
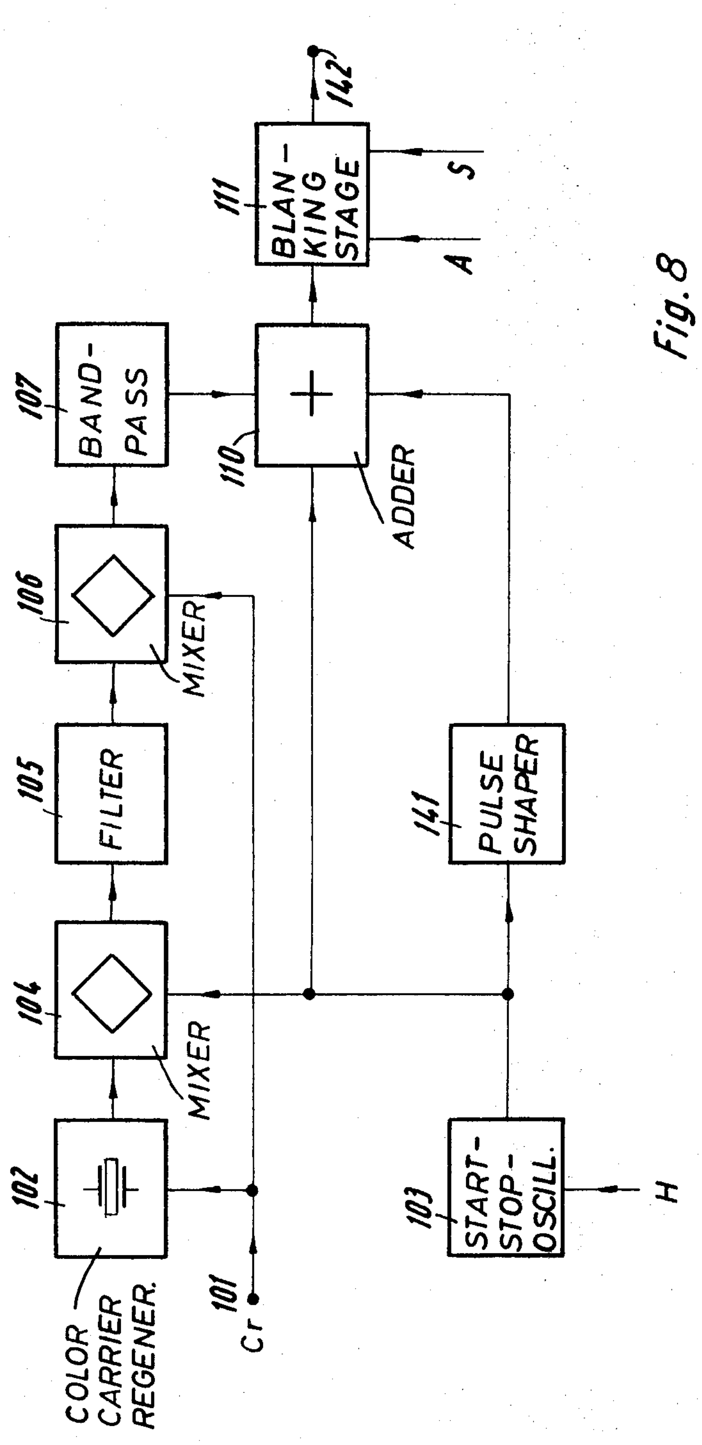
FIG. 8 is a block diagram of another embodiment for preparing the chrominance signal prior to application to the optical standard converter.
Figure 9:
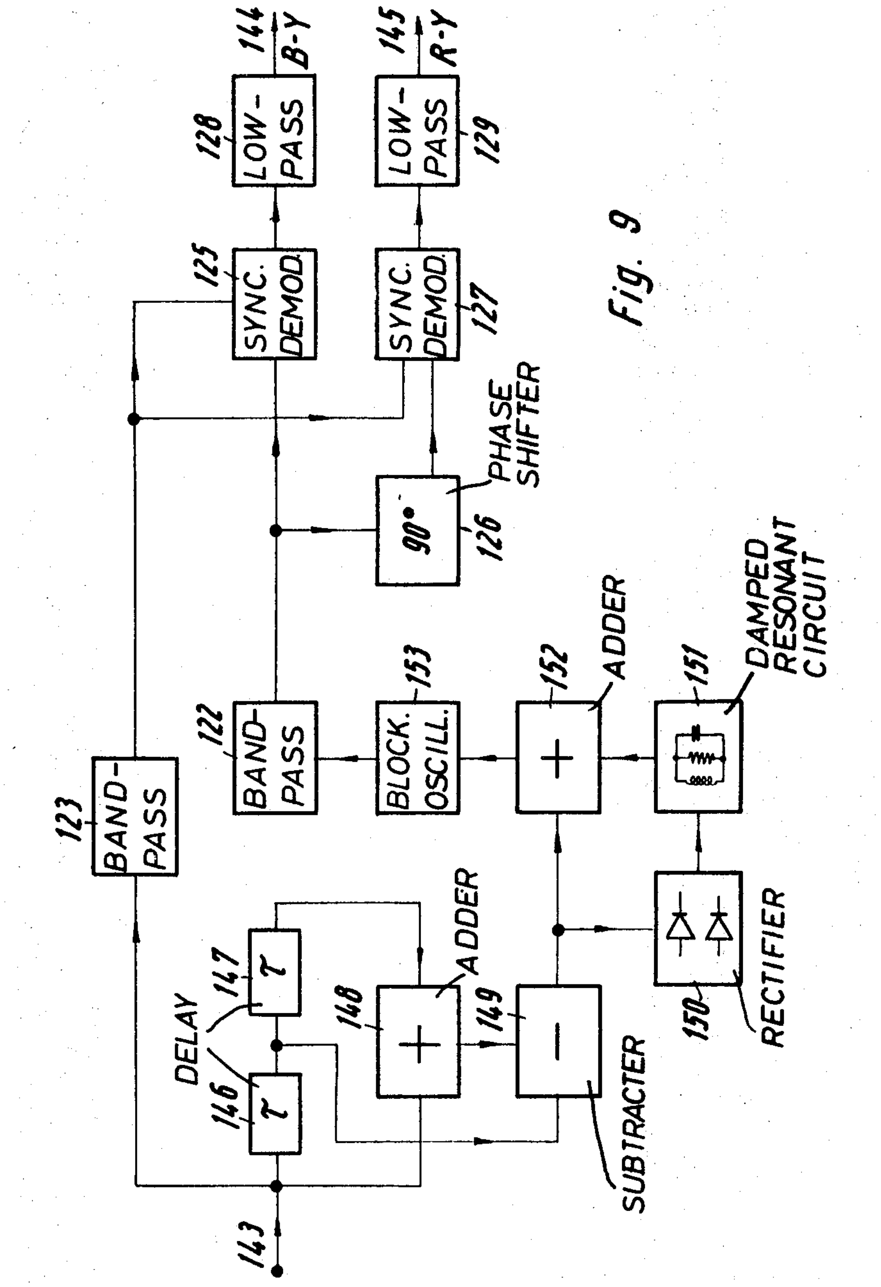
FIG. 9 is a block diagram for further processing the signals derived from the optical standard converter of FIG. 8.
Figure 10:
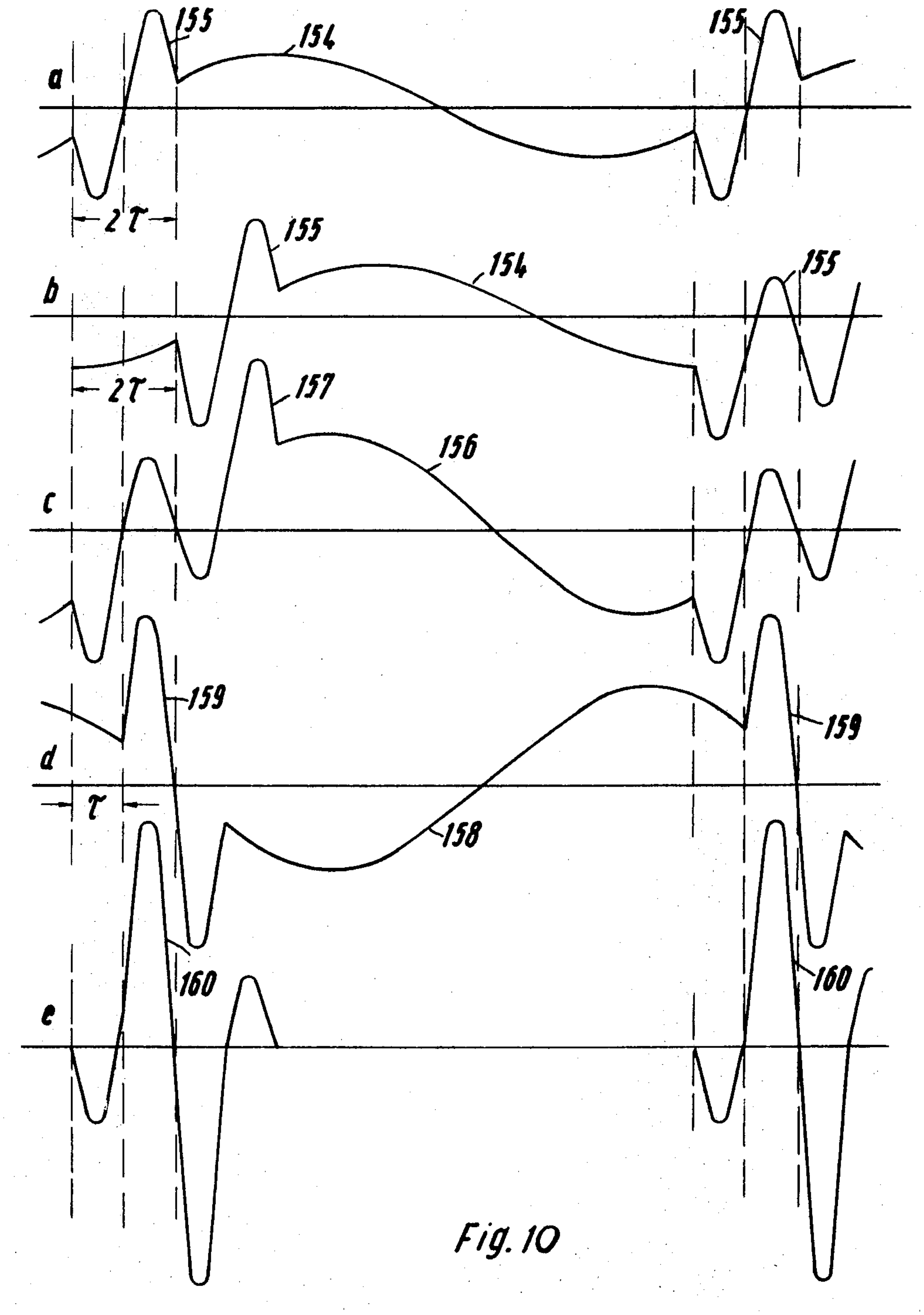
FIG. 10 is a graphical representation of the waveforms and curves describing the operation of the method of FIG. 9.

FIGS. 8, 9 and 10 show another embodiment for carrying out the method of the present invention, in which pulse-shaped signals are used for the pilot frequency. The pulse repetition frequency of the resulting pulse-shaped signals, is equal to the auxiliary carrier frequency.

FIG. 8 shows the block diagram of the arrangement for changing or converting the chrominance signal from the first standard into a new chrominance signal with an auxiliary carrier of lower frequency. This embodiment of FIG. 8, furthermore, is used for producing pulse-shaped pilot signals which are applied to the new chrominance signal prior to the standard conversion.

FIG. 9 is a block diagram of the arrangement for deriving the reference carrier from the standard converted chrominance signal with lower carrier frequency. This signal is used for precise synchronizing demodulation of the new chrominance signal for realizing the video frequency components.

FIG. 10 shows finally the wave forms which prevail in the processing of the pulse-shaped pilot signal in the arrangement of FIG. 9.

In the arrangement of FIG. 8, the chrominance signal of the color television signal is applied to the terminal 101. The color television signal which is to be converted in its reference standard, for example, may be a color television signal corresponding to the American standard of 525 lines and 60 half pictures per second of the NTSC color television system. The unmodulated color carrier with, for example, 3.6 MHz. frequency, is derived in a color carrier regenerator 102. The start-stop oscillator 103 provides the auxiliary carrier for the new chrominance signal. The horizontal synchronizing pulses H from the television signal to be converted, are applied to this start-stop oscillator 103. As a result, the oscillator 103 becomes actuated anew at the beginning of each line period, and provides in each line period an oscillation with auxiliary carrier frequency of, for example, 1 MHz. These oscillations at the beginning of each line period are to be established with the same or identical phase relationship. For this reason, the frequency spectrum of these oscillations includes components which correspond to integral multiples of the line frequency. The auxiliary carrier formed, in this manner, with a frequency of, for example, 1 MHz. is applied to the mixer 104. The latter also receives the regenerated color carrier of the chrominance signal to be converted with, for example, 3.6 MHz. frequency. The frequency sum resulting from opposite modulation of the two input frequency signals is, for example, 4.6 MHz., and becomes filtered through a filter unit 105. The unmodulated oscillation with a frequency of 4.6 MHz. becomes mixed within a second mixer 106, with the double modulated chrominance signal having a color carrier of, for example, 3.6 MHz. From the difference of these two frequencies, a new chrominance signal results with a lower frequency than that of the auxiliary carrier corresponding to the color frequency of 1 MHz. The latter lies within a frequency band of approximately 0.2 to 1.8 MHz, corresponding to the maximum modulation frequency of the chrominance signal of approximately 0.8 MHz. The frequency band is separated from the remaining combined frequencies realized from the mixer 106, through means of the band-pass filter 107.

The pulse-shaped pilot signal is derived from the auxiliary carrier of the start-stop oscillator 103, through a pulse shaper 141. The pilot signal has a wave form of a double pulse with two adjacently connected spike-shaped pulses situated in opposite directions. Such a double pulse can be produced within the pulse shaper 141, in the conventional manner, by producing a substantially rectangular-shaped oscillatory signal through double limiting. Upon differentiation of this oscillatory signal, narrow pulses are realized, with direction corresponding to the signal step function in the rectangular-shaped signal. Thus, the leading and trailing steep edges of this rectangular shaped signal correspond to the intersections of the null axis of the auxiliary carrier oscillating signal. These edges of the rectangular-shaped pulses then provide the narrow pulses upon differentiation, and these narrow pulses will alternatingly vary in direction, depending upon whether a leading edge or trailing edge of the rectangular-shaped pulses is undergoing differentiation. Through a clipping circuit, each second pulse may be suppressed, and a pulse train with pulses all in the same direction, may be realized. In this manner, the pulse train will have pulses which follow each other in correspondence to the auxiliary carrier frequency. Through a further differentiation of these pulses oriented all in the same direction, double pulses with two adjacently interconnecting narrow pulses lying in opposite directions, may be realized.

This pulse-shaped pilot signal is applied to the new chrominance signal in an adder 110, after the band-pass filter 107. In the adding stage 110 compensation is also applied to the fundamental or basic oscillation contained in the pulse-shaped pilot signal. The compensation is performed with auxiliary carrier frequency by applying to the adder an oppositely phased auxiliary carrier oscillatory signal of predetermined amplitude and phase.

The new chrominance signal provided with pulse-shaped pilot signal is made available from the terminal 142 finally, after applying blanking or sampling and synchronizing signals in the blanking or sampling stage 111. For this purpose, the sampling or blanking signal A and the synchronizing signal S are applied to the stage 111, whereas the terminal 142 applies its output to the standard converter.

FIG. 9 shows a block diagram of an arrangement for deriving the video frequency components of the standard converted chrominance signal with the aid of the reference carrier derived from the pulse-shaped pilot signal. The standard converted chrominance signal is applied to the arrangement through the input terminal 143.

The standard converted new chrominance signal is applied to the two synchronizing demodulators 125 and 127, by way of the band-pass filter 123. The transmission region of this band-pass filter 123 corresponds to the frequency region of the new chrominance signal. The reference carrier is applied directly to the synchronizing demodulator 125, whereas a 90° phase shift is applied by the unit 126 prior to applying the reference carrier to the synchronizing demodulator 127. The phase shift circuit 126 is, for this purpose, connected between the band-pass filter 122 and the respective input of the synchronizing demodulator 127. The video frequency components realized from the demodulators 125 and 127 through synchronizing demodulation of the chrominance signal, becomes separated from their high-frequency portions, within the low-pass filters 128 and 129 connected to the demodulators 125 and 127, respectively. The video frequency components of the chrominance signals, the color difference signals B–Y and R–Y are made available at the terminals 144 and 145 of the arrangment. To form the chrominance signal of the standard converted color television signal, these signal components become modulated onto the color auxiliary carrier of the new standard, in the conventional manner, through a color modulator not shown in the drawing.

The production of the reference carrier with the frequency of the standard converted auxiliary through the aid of the pulse-shaped pilot signal contained in the new standard-converted chrominance signal, will be described in conjunction with the aid of FIG. 10. The standard converted new chrominance signal is composed of the modulated color carrier oscillation 154 and the double-spiked pulse 155 superimposed in each oscillating period, as shown in FIG. 10*a*. This standard-converted new chrominance signal becomes delayed by the amount of $2\tau$ of the double-spiked pulse 155. For the purpose of applying this delay two delay circuits 146 and 147 are connected in series, with each circuit having a delay interval $\tau$ associated with it. FIG. 10*b* shows the delayed signal resulting from a delay of $2\tau$. The delayed and the undelayed signal become then added within an adding stage 148. In the signal sum of FIG. 10*c*, a color carrier 156 prevails with amplitude double that of the color carrier 154. A pulse-shaped signal 157 furthermore, has double the duration of the pulse 155 shown in FIG. 10*c*. A new chrominance signal is extracted from the preceding signal through a subtraction unit 149. This new chrominance signal is delayed by only the amount $\tau$ from the original signal of FIG. 10*a*, and its amplitude is made equal to the signal sum of FIG. 10*c*. This signal is taken from the first delay circuit 146, and is thereby delayed by the time interval $\tau$. For the purpose of illustrating the operation or effect of the subtraction, this signal is shown with reversed polarity in FIG. 10*c*. From FIG. 10*c*, it is possible to see that the modulated color carriers 156 and 158 become compensated through the difference formation, and that these modulated color carriers are no longer contained within the difference signal of FIG. 10*c*. The difference signal contains now reference to amplitude and duration in contrast to the original double pulse signal of FIG. 1 *a* in the form of the magnified pulse signal 116. The latter appears with pulse repetition frequency of the standard converted auxiliary carrier.

The pulse-shaped pilot signal derived in this manner actuates an oscillating circuit 151 with predetermined damping. This oscillating circuit 151 is tuned to the standard converted auxiliary carrier. Prior to applying the pilot signal to the oscillating circuit 151, a rectifier arrangement 150 changes the form of the pilot signal so that all components have the same direction. Thus, all of the negative components or component portions, for example, are flapped-over to the positive direction, for the purpose of increasing the information content and the resistance to interference. The substantially sinusoidal-shaped oscillatory signal from the oscillator 151, is applied to an adder 152 for purposes of adding to the output of the subtracting unit 149. The addition is made substantially at the instant of time of maximum amplitude. The output signal of the adding stage 152 is used to synchronize a blocking oscillator 153 which produces the reference carrier. This reference carrier is applied, through the band-pass filter 122, to the synchronizing demodulator 125. After phase shifting of 90° through the phase-shift circuit 126, the reference carrier is also applied to the demodulator 127. The phase relationship of the reference carrier can be set to the correct phase value, by means of an adjustable phase-shift circuit, not shown in the FIGURE.

It will be understood that each of the elements described above, or two or more together, may also find a useful application in other types of color standard conversion methods differing from the types described above.

While the invention has been illustrated and described as embodied in a color standard conversion method, it is not intended to be limited to the details shown, since various modifications and structural changes may be made without departing in any from the spirit of the present invention.

We claim:

1. A method for color standard conversion in color television for converting from a first standard having a color carrier to a second standard, comprising the steps of separating the color television signal to be converted into luminance and chrominance components; mixing the chrominance component from said separating step with a predetermined frequency for generating an auxiliary chrominance signal on a color carrier of which the frequency is an integral multiple of the line frequency of the color television signal to be converted and is lower than the color carrier frequency of the first standard; reproducing said auxiliary chrominance signal on a black-white picture screen; scanning said picture screen corresponding to the synchronizing standard to which said color television signal is to be converted; converting the signal from said scanning step to a chrominance signal of the desired frequency of the second standard; converting the luminance signal to said second standard; and combining said converted chrominance signal with the converted luminance signal.

2. The method as defined in claim 1, including the steps of combining said auxiliary chrominance signal with a pilot frequency being a multiple of the horizontal frequency, said pilot frequency lying outside of the frequency band used for said auxiliary chrominance signal; converting said combined pilot frequency and auxiliary chrominance signal in a first black-white standards converter; modifying the frequency of the converted pilot frequency to the frequency of the carrier of the converted auxiliary signal; demodulating said converted auxiliary signal for producing a first color difference signal; shifting the phase of said modified pilot frequency by 90°; demodulating the converted auxiliary signal for producing a second color difference signal, said modified pilot frequency in said demodulating steps being a reference frequency; delaying said luminance signal for time compensating; and processing said time compensated luminance signal together with said color difference signals in an encoder for converting said television signal to said second standard.

3. The method as defined in claim 2, wherein the pilot frequency signal combined with said auxiliary chrominance signal has a frequency double the frequency of said color carrier of said auxiliary chrominance signal.

4. The method as defined in claim 3, wherein the frequency of said color carrier is 260 times the horizontal frequency.

5. The method as defined in claim 4, wherein said luminance signal has a carrier, and said pilot frequency is the carrier of said luminance signal.

6. The method as defined in claim 1, including the step of controlling a start-stop oscillator with the horizontal frequency of said first standard; and generating said color carrier of the auxiliary chrominance signal through said start-stop oscillator.

7. The method as defined in claim 6, including the step of regenerating the color carrier of the first standard; mixing the regenerated color carrier with said color carrier of said auxiliary chrominance signal; combining the mixed signal with the chrominance signal of said first standard for producing a difference frequency signal, said difference frequency signal being the auxiliary chrominance signal.

8. The method as defined in claim 7, including the step of adding to said auxiliary chrominance signal two pilot frequency signals being integral multiples of the frequency of said color carrier of said auxiliary chrominance signal.

9. The method as defined in claim 8, wherein one pilot frequency is triple the frequency of the color carrier of said auxiliary chrominance signal, and the other pilot frequency is five times the frequency of said color carrier of said auxiliary chrominance signal.

10. The method as defined in claim 9 including the step of doubling one pilot frequency; mixing the doubled pilot frequency with the other pilot frequency and producing thereby a difference frequency signal; demodulating said auxiliary chrominance signal with said difference frequency signal being the reference carrier for generating the video frequency components of the chrominance signal.

11. The method as defined in claim 10 including the step of amplitude limiting one of said pilot frequencies with the color carrier of said auxiliary chrominance signal with frequency multiplied by a factor of 3; adding said amplitude limited pilot frequency to said reference carrier; limiting the signal sum resulting from the addition of said reference carrier and said amplitude limited pilot frequency; and filtering said signal sum for producing the reference carrier for said demodulation step.

12. The method as defined in claim 11, including the step of amplitude limiting one of said pilot frequencies with the frequency of the color carrier of said auxiliary chrominance signal with frequency multiplied by a factor of 5 to thereby produce a second amplitude limited pilot frequency; and adding said second amplitude limited pilot frequency to said reference carrier and the first amplitude limited pilot frequency.

13. The method as defined in claim 6, wherein said pilot frequency comprises pulse-shaped signals with pulse repetition frequency equal to the frequency of the color carrier of said auxiliary chrominance signal.

14. The method as defined in claim 13, including the step of compensating the fundamental wave components in said pulse-shaped signals with a signal opposite in phase to said fundamental wave components and with frequency equal to the frequency of the color carrier of said auxiliary chrominance signal, said compensating signal of opposite phase being of predetermined amplitude and phase relationship.

15. The method as defined in claim 13, wherein the waveform of said pulse-shaped signal comprises two adjacently connected spike-shaped pulses situated in opposite directions and being double pulses.

16. The method as defined in claim 15, wherein the duration of said pulse-shaped signals is within the range of 100 to 400 nsec.

17. The method as defined in claim 15, including the step of delaying said auxiliary chrominance signal; adding the delayed chrominance signal with the undelayed chrominance signal; delaying the television signal by half the delay; subtracting the delayed television signal from the sum of said delayed and undelayed chrominance signals to produce a difference signal; exciting an oscillating circuit with the frequency of the color carrier of said auxiliary chrominance signal through the pulse-shaped signal in said difference signal; adding said pulse-shaped signal in said difference signal to the color carrier of said auxiliary chrominance signal to form a combined signal; and synchronizing a synchronizable oscillator for producing the reference carrier for the demodulation of said auxiliary chrominance signal.

18. The method as defined in claim 17, wherein said synchronizable oscillator comprises a blocking oscillator.